(12) United States Patent
Kim

(10) Patent No.: US 8,592,062 B2
(45) Date of Patent: Nov. 26, 2013

(54) BATTERY PACK

(75) Inventor: Changseob Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 743 days.

(21) Appl. No.: 12/588,341

(22) Filed: Oct. 13, 2009

(65) Prior Publication Data

US 2010/0092861 A1 Apr. 15, 2010

(30) Foreign Application Priority Data

Oct. 13, 2008 (KR) .................. 10-2008-0100054

(51) Int. Cl.
*H01M 14/00* (2006.01)

(52) U.S. Cl.
USPC ............................ 429/7; 429/163; 429/178

(58) Field of Classification Search
USPC ............................. 429/7, 163, 178
See application file for complete search history.

(56) References Cited

U.S. PATENT DOCUMENTS

| 5,684,384 A * | 11/1997 | Barkat et al. ............... 307/66 |
| 2002/0142794 A1 * | 10/2002 | Harano ..................... 455/550 |
| 2004/0017501 A1 | 1/2004 | Asaga et al. |
| 2004/0246382 A1 * | 12/2004 | Liu ............................. 348/734 |
| 2005/0017678 A1 * | 1/2005 | Hiratsuka et al. .......... 320/112 |
| 2006/0214632 A1 * | 9/2006 | Lee et al. ..................... 320/112 |
| 2007/0154785 A1 | 7/2007 | Seo et al. |
| 2007/0222681 A1 * | 9/2007 | Greene et al. .......... 343/700 MS |

FOREIGN PATENT DOCUMENTS

| JP | 2003-318585 A | 7/2003 |
| KR | 10 2006-0103030 A | 9/2006 |
| KR | 10-2007-0071252 A | 4/2007 |
| KR | 10 2007-0071252 A | 7/2007 |
| KR | 10 2007-0113039 A | 11/2007 |
| KR | 10 2008-0032912 A | 4/2008 |

OTHER PUBLICATIONS

Corrosion Control—Galvanic Table, Army Missile Command Reports RS-TR-67-11, "Practical Galvanic Series," available at http://www.eaa1000.ay.org/technicl/corrosion/galvanic.htm.*
Korean Notice of Allowance in KR 10-2008-0100054, dated Oct. 25, 2010 (Kim).

* cited by examiner

*Primary Examiner* — Ula C Ruddock
*Assistant Examiner* — Scott J Chmielecki
(74) *Attorney, Agent, or Firm* — Lee & Morse, P.C.

(57) ABSTRACT

A battery pack including a bare cell, a metal case covering the outer surface of the bare cell, and a protection circuit board electrically connected to the metal case.

18 Claims, 4 Drawing Sheets

BATTERY PACK

BACKGROUND OF THE INVENTION

1. Field of the Invention

Embodiments relate to a battery pack.

2. Description of the Related Art

In general, a battery pack may include, e.g., a lithium polymer battery, in which a pouch type bare cell may be connected to a protection circuit member, and a plastic case in which the lithium polymer battery may be received and to which the periphery of the, e.g., lithium polymer battery, may be fused. In the pouch type bare cell, an electrode assembly having a positive electrode plate, a separator, and a negative electrode plate, and a polymer electrolyte may be received in a pouch made of, e.g., cast polypropylene (CPP), aluminum, nylon or polyethylene terephthalate (PET).

In a polymer battery pack, a pouch of a bare cell and a plastic case surrounding it may be weak. Accordingly, the polymer battery pack may be easily damaged by an external impact due to, e.g., bending, twisting, or falling, thereby deteriorating stability and reliability.

SUMMARY

Embodiments are therefore directed to a battery pack, which substantially overcomes one or more of the problems due to the limitations and disadvantages of the related art.

It is a feature of an embodiment to provide a battery pack that enhances the performance of an antenna of a communication device.

It is therefore another feature of an embodiment to provide a battery pack that has enhanced strength against an external impact.

At least one of the above and other features and advantages may be realized by providing a battery pack including a bare cell having an outer surface, a metal case covering the outer surface of the bare cell, and a protection circuit board electrically connected to the metal case.

The bare cell may include another surface and a positive electrode tab and a negative electrode tab, and the positive electrode tab and negative electrode tab may protrude from the other surface of the bare cell, the protection circuit board may be disposed on the other surface of the bare cell, from which other surface the positive electrode tab and the negative electrode tab of the bare cell protrude; wherein the protection circuit board includes a positive electrode pad and a negative electrode pad to which the positive electrode tab and the negative electrode tab of the bare cell are connected, and wherein the protection circuit board includes an antenna pad electrically connected to the metal case.

The metal case may include a connection terminal and the metal case may be electrically connected to the antenna pad through the connection terminal.

The metal case may include a first case and a second case and the connection terminal may be disposed on at least one of the first case and the second case.

The metal case may include a ground terminal electrically connected to one of the positive electrode tab and the negative electrode tab of the bare cell and which is grounded.

The metal case may include a first case and a second case and the ground terminal may be disposed on at least one of the first case and the second case.

The ground terminal may be electrically connected to the negative electrode tab.

The bare cell may include first and second wide surfaces and right and left narrow surfaces, and the metal case may include a first case covering the first wide surface and the right and left narrow surfaces of the bare cell and a second case covering the second wide surface and the right and left narrow surfaces of the bare cell.

The first case and the second case may each include opposite sides and the opposite sides of the first case and the second case may each be bent to form extensions, and the first and second cases may be coupled to each other by coupling the extensions.

The metal case may include at least one of steel and stainless steel.

The metal case may include stainless steel (SUS).

The metal case may include a metal having a corrosion potential and the corrosion potential may be lower than the corrosion potential of aluminum.

The bare cell may have a periphery, side surfaces, a bottom surface and a frame disposed at the periphery of the bare cell and covering the side surfaces and bottom surface of the bare cell.

The bare cell may include a top surface and an electrode tab protruding from the top surface, and the frame may include an upper frame disposed on the top surface of the bare cell and a lower frame covering the side surfaces and bottom surface of the bare cell.

The upper frame may include a through hole, the protection circuit board may include an external terminal and the external terminal may protrude through the through hole.

The bare cell may be a pouch type secondary battery.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
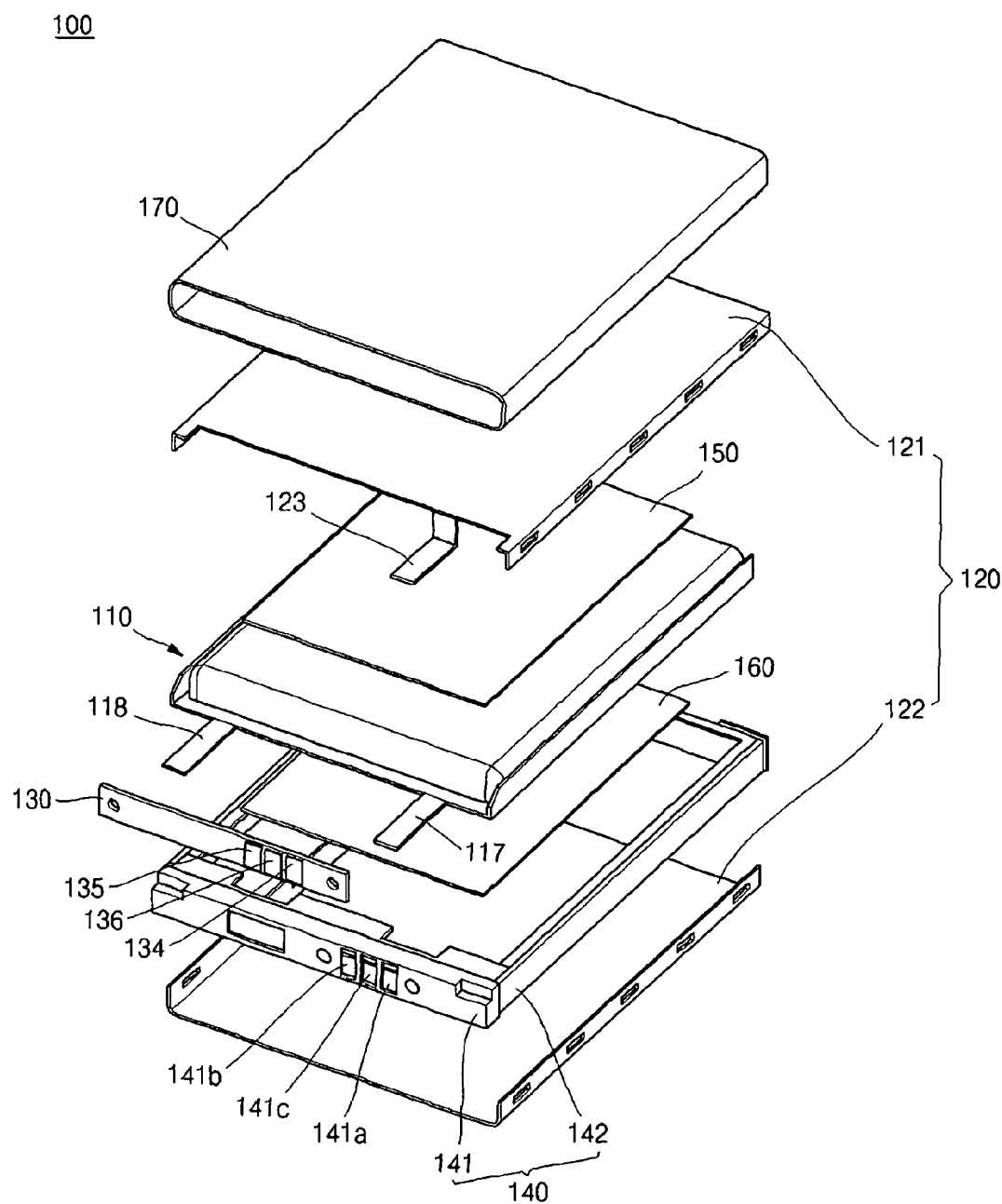
FIG. 1 illustrates an exploded perspective view of a battery pack according to an embodiment.

Korean Patent Application No. 10-2008-0100054, filed on Oct. 13, 2008, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or surface, it can be directly on the other layer or surface, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
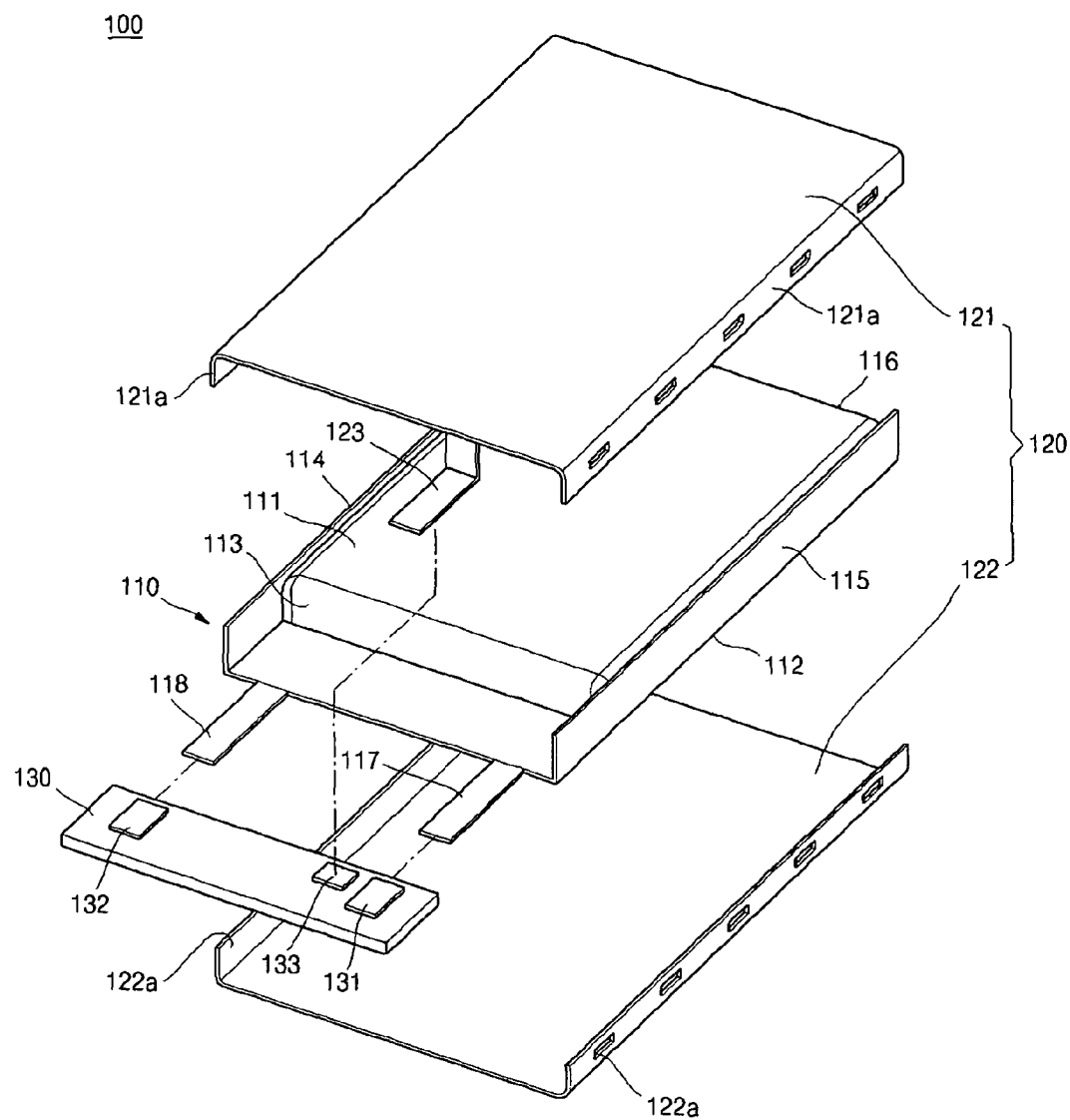
FIG. 2 illustrates a view of a bare cell, a metal case and a protection circuit board of the battery pack according to the embodiment.

Hereinafter, embodiments will be described in detail with reference to the accompanying drawings. FIG. 1 illustrates an exploded perspective view of a battery pack according to an embodiment. FIG. 2 illustrates a view of a bare cell, a metal case and a protection circuit board of the battery pack according to the embodiment.

Referring to FIGS. 1 and 2, the battery pack 100 according to the embodiment may include a bare cell 110, a metal case 120 surrounding the outer surface of the bare cell 110 and a protection circuit board 130 electrically connecting the metal case 120 to a communication device (not shown) in which the battery pack 100 may be installed. A frame 140 may be disposed around the bare cell 110.

The bare cell 110 may be surrounded by a pouch type sheath. A positive electrode plate (not shown), a separator (not shown), and a negative electrode plate (not shown) may be, e.g., stacked and wound in a jelly-roll type configuration, and may be received in the bare cell 110 together with an electrolyte.

The bare cell 110 may have a substantially rectangular parallelepiped shape. The bare cell 110 may include first and second wide surfaces 111 and 112 and other surfaces, namely, third to sixth narrow surfaces 113 to 116 connecting the first and second surfaces 111 and 112. A positive electrode tab 117 and a negative electrode tab 118 may protrude from the another surface, namely a top surface or third surface 113 of the bare cell 110.

The sheath surrounding the bare cell 110 may have a multi-layer structure. A metal layer may be formed at the center of the multi-layered sheath, and first and second insulation layers may be formed on the outer and inner surfaces thereof. The metal layer may include, e.g., steel, aluminum, and/or their equivalents. The first insulation layer may include, e.g., nylon, polyethylene terephthalate (PET), and/or their equivalents. The second insulation layer may be a bonding layer, and may include, e.g., cast polypropylene (CPP) and/or its equivalents.

The metal case 120 may include a first case 121 covering the first wide surface 111 and the fourth and fifth right and left surfaces 114 and 115 of the bare cell 110. The metal case 120 may also include a second case 122 covering the second wide surface 122 and the fourth and fifth right and left surfaces 114 and 115.

The first case 121 may have extensions 121a formed by bending its opposite sides so that it covers the first surface 111 and the fourth and fifth surfaces 114 and 115 of the bare cell 110. The second case 122 may also have extensions 122a formed by bending its opposite sides so that it covers the second surface 112 and the fourth and fifth surfaces 114 and 115 of the bare cell 110.

The extensions 121a and 122a of the first and second cases 121 and 122 may be coupled to each other on the fourth and fifth surfaces 114 and 115 of the bare cell 110. One of the extensions 121a and 122a may be inserted into the other in order to couple the first and second cases 121 and 122. Alternatively, locking holes (not shown) may be formed in one of the extensions and locking bosses (not shown) may be formed in the other so that the locking bosses may be inserted into the locking holes. However, the embodiments are not limited to those coupling methods.

The metal case 120 may include, e.g., steel, stainless steel, generally, stainless steel (SUS) particularly, and/or their equivalents. The material of the metal case 120 is preferably a metal whose corrosion potential is lower than that of aluminum. This is because a metal of high corrosion potential may be easily corroded when current is excessively introduced. However, the material of the metal case 120 is not specifically limited, and may be any material suitable for the function of the metal case 120 according to the embodiments.

The metal case 120 may include a connection terminal 123 electrically connected to the protection circuit board 130. The connection terminal 123 may be connected to at least one of the first and second cases 121 and 122 of the metal case 120. This is because the first and second cases 121 and 122 of the metal case 120 may be coupled to each other by the extensions 121a and 122a such that current may flow therebetween. In the embodiment, the connection terminal 123 may be connected to the first case 121 of the metal case 120. The connection terminal 123 may be disposed at a position corresponding to an antenna pad 133 of the protection circuit board 130.

The protection circuit board 130 may be disposed on the third surface 113 of the bare cell 110. A positive electrode pad 131, a negative electrode pad 132 and an antenna pad 133 may be disposed on a surface of the protection circuit board 130. Various protection circuits (not shown) for controlling, e.g., charge and discharge of the bare cell 110, may be installed in the protection circuit board 130.

The positive electrode pad 131 may be electrically connected to the positive electrode tab 117 of the bare cell 110 and the negative electrode pad 132 may be electrically connected to the negative electrode tab 118. The antenna pad 133 may be electrically connected to the connection terminal 123 of the metal case 120.

An external positive electrode terminal 134 electrically connected to the positive electrode pad 131, an external negative electrode terminal 135 electrically connected to the negative electrode pad 132 and an antenna terminal 136 electrically connected to the antenna pad 133 may be disposed on the opposite surface of the protection circuit board 130.

The frame 140 may surround the third to sixth side surfaces 113 to 116 of the bare cell 110. The frame 140 may include an upper frame 141 on the third surface 113 of the bare cell 110, and a lower frame 142 on the fourth to sixth 114 to 116 surfaces of the bare cell 110. Through-holes 141a, 141b, and 141c, through which the external positive electrode terminal 134, the external negative electrode terminal 135 and the antenna terminal 136 protrude, may be disposed in the upper frame 141.

Insulation members 150 and 160 may be disposed between the first surface 111 of the bare cell 110 and the first case 121 of the metal case 120, and between the second surface 112 of the bare cell 110 and the second case 122 of the metal case 120, respectively. The insulation members 150 and 160 are preferably adhesive tape. Double-sided tape may be used as the adhesive tape in order to bond the bare cell 110 to the metal case 120.

A label 170 may be wound on the assembly of the bare cell 110, the frame 140 and the metal case 120. The label 170 may firmly fix the frame 140 and the metal case 120 to the bare cell 110, and may function as an insulator.

Hereinafter, the operation of the battery pack according to the embodiment will be described. The positive electrode pad 131 and the negative electrode pad 132 in the protection circuit board 130 may be electrically connected to a charger, so the battery pack 100 according to the embodiment may carry out recharging operations.

With the battery pack 100 being mounted to a communication device, the connection terminal 123 of the first case 121 of the metal case 120 may be connected to the communication device through the antenna pad 133 and the antenna terminal 134. Thus, signals of external waves may be transmitted to the communication device through the metal case 120. Accordingly, the metal case 120 of the battery pack 100 may perform the function of an antenna, thereby beneficially enhancing the communication sensitivity of the communication device, even if the communication device does not include a separate antenna. Moreover, an installation space for an antenna can be excluded, thereby desirably minimizing the size of the communication device and improving the degree of freedom in design.

In the battery pack 100, the metal case 120, whose outer surface may surround the bare cell 110, may also protect the bare cell 110 from an external impact. The reliability of a polymer battery using a pouch type sheath may thereby be improved.

Figure 3:
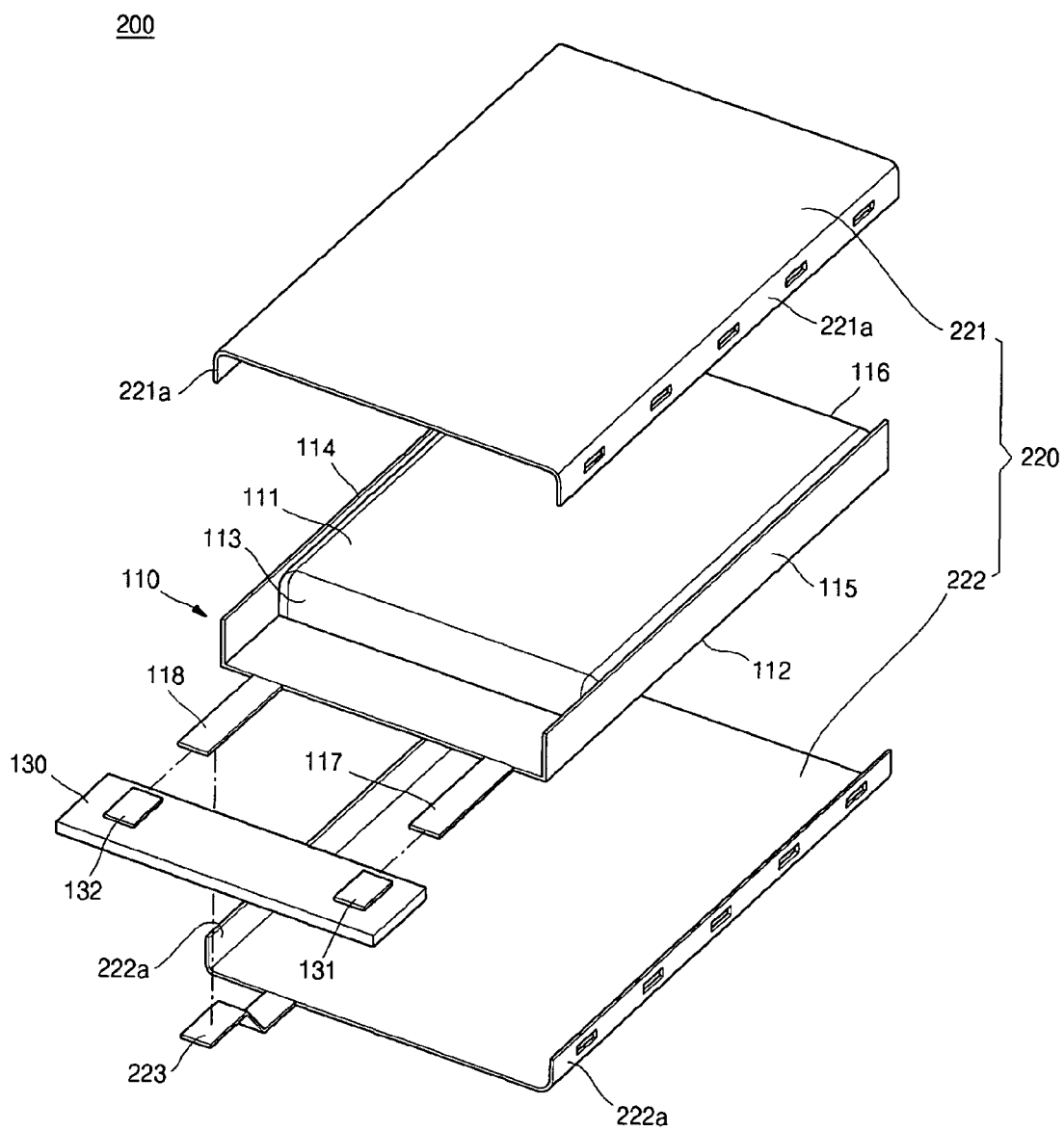
FIG. 3 illustrates a view of a bare cell, a metal case and a protection circuit board of a battery pack according to another embodiment.

Next, a battery pack according to another embodiment will be described. FIG. 3 illustrates a view of a bare cell, a metal case and a protection circuit board of a battery pack according to another embodiment.

Referring to FIG. 3, the battery pack 200 according to the embodiment may include a bare cell 110, a metal case 220 surrounding the outer surface of the bare cell 110 and a protection circuit board 130 electrically connecting the metal case 220 and a communication device (not shown) in which the battery pack 200 may be installed.

The additional structures of the battery pack according to the embodiment are the same as those of the battery pack according to the above embodiment. Accordingly, the same elements are labeled with the same reference numerals; and repeated detailed descriptions of the same elements and operations will be omitted.

In the battery pack 200 according to the embodiment, the metal case 220 may include a first case 221 covering the first surface 111, the fourth surface 114, and the fifth surface 115 of the bare cell 110, and a second case 222 covering the second surface 112, the fourth surface 114, and the fifth surface 115 of the bare cell 110. Extensions 221a and 222a may be formed on opposite sides of the first and second cases 221 and 222, and the first and second cases 221 and 222 may be coupled to the fourth and fifth side surfaces 114 and 115 of the bare cell 110.

The metal case 220 may include, e.g., steel, stainless steel (SUS), and/or their equivalents. The material of the metal case 220 is preferably a metal whose corrosion potential is lower than that of aluminum.

The metal case 220 may include a ground terminal 223 electrically connected to the bare cell 110. The ground terminal 223 may be connected to at least one of the first and second cases 221 and 222 of the metal case 220. This is because the first and second cases 221 and 222 of the metal case 220 may be coupled to each other by the extensions 221a and 222a such that current may flow therebetween. In the present embodiment, the ground terminal 223 may be connected to the second case 222 of the metal case 220.

The ground terminal 223 of the metal case 220 may be connected to one of the electrode tabs of the bare cell 110. The ground terminal 223 is preferably connected to the negative electrode tab 118. Accordingly, the ground terminal 223 may be disposed at a position corresponding to the negative electrode tab 118 of the second case 222.

The battery pack 200 according to the present embodiment may be mounted to a communication device, or the ground terminal 223 disposed on the second case 222 of the metal case 220 may be grounded when it is electrically connected to the negative electrode tab 118 with the battery pack 200 connected to a charger to carry out a charging operation. Accordingly, the metal case 220 forming the structure of the battery pack 200 may be electrically grounded.

Figure 4:
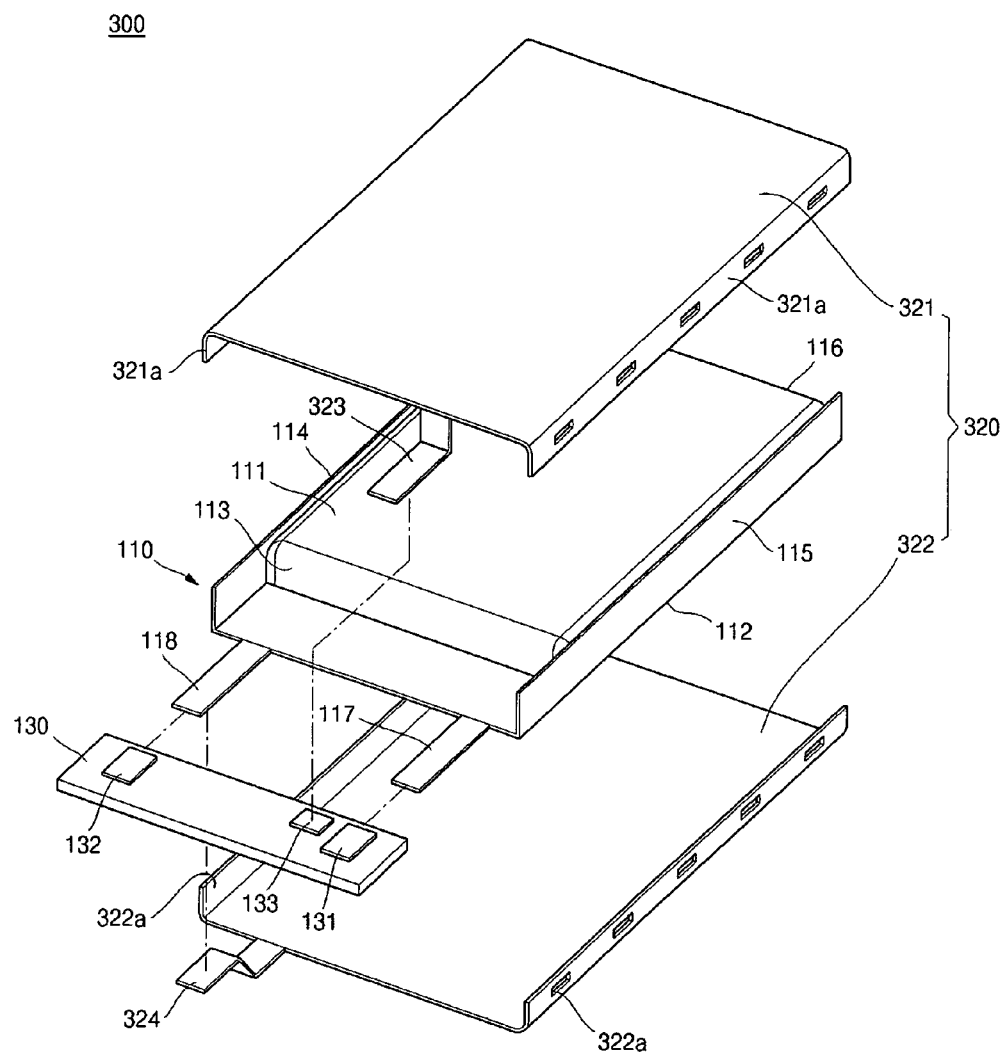
FIG. 4 illustrates a view of a bare cell, a metal case and a protection circuit board of a battery pack according to still another embodiment.

Next, a battery pack according to still another embodiment will be described. FIG. 4 illustrates a view of a bare cell, a metal case and a protection circuit board of a battery pack according to still another embodiment.

Referring to FIG. 4, the battery pack 300 according to the embodiment may include a bare cell 110, a metal case 320 surrounding the outer surface of the bare cell 110 and a protection circuit board 130 electrically connecting the metal case 320 and a communication device (not shown) in which the battery pack 300 may be installed.

The additional structures of the battery pack according to the present embodiment may be the same as those of the battery pack according to the above embodiment. Accordingly, the same elements are labeled with the same reference numerals; and repeated detailed descriptions of the same elements and operations will be omitted.

In the battery pack 300 according to this embodiment, the metal case 320 may include a first case 321 covering the first surface 111, the fourth surface 114 and the fifth surface 115 of the bare cell 110 and a second case 322 covering the second surface 112, the fourth surface 114 and the fifth surface 115 of the bare cell 110. Extensions 321a and 322a may be formed on opposite sides of the first and second cases 321 and 322. The first and second cases 321 and 322 may be coupled to the fourth and fifth side surfaces 114 and 115 of the bare cell 110.

The metal case 320 may include, e.g., steel, stainless steel (SUS), and/or their equivalents. The material of the metal case 320 is preferably a metal whose corrosion potential is lower than that of aluminum.

The metal case 320 may include a connection terminal 323 electrically connected to the protection circuit board 130. The connection terminal 323 may be electrically connected to the antenna pad 133 of the protection circuit board 130. The connection terminal 323 may be connected to at least one of the first case 321 and the second case 322 of the metal case 320.

The metal case 320 may include a ground terminal 324 electrically connected to the bare cell 110. The ground terminal 324 may be connected to one of the electrode tabs of the bare cell 110. The ground terminal 324 is preferably connected to the negative electrode tab 118. The ground terminal 324 may be connected to one of the first case 321 and the second case 322 of the metal case 320.

In the battery pack 300 according to the embodiment, the connection terminal 323 may be provided in the first case 321. The connection terminal 323 may be disposed on the first case 321 at a position corresponding to the antenna pad 133 of the protection circuit board 130. The ground terminal 324 may be provided in the second case 322. The ground terminal 324 may be disposed on the second case 322 at a position corresponding to the negative electrode tab 118 of the bare cell 110.

When the battery pack 300 according to the embodiment is used in a communication device, the connection terminal 323 on the first case 321 of the metal case 320 may be connected to the communication device through the antenna pad 133. Thus, signals of external waves may be transmitted to the communication device through the metal case 320.

The battery pack 300 according to the embodiment may be mounted in a communication device, or the ground terminal 324 in the second case 322 of the metal case 320 may be grounded when it is electrically connected to the negative electrode tab 118 with the battery pack 300 connected to a charger to carry out a charging operation. Accordingly, the metal case 220 forming the structure of the battery pack 300 may be electrically grounded.

An antenna may be separately mounted to a communication device, e.g., a mobile phone, in which a typical polymer battery pack may be used. Such an antenna may occupy space in a communication device, making it difficult to miniaturize the communication device and restricting the degree of freedom in design.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a bare cell having an outer surface, another surface, and a positive electrode tab and a negative electrode tab, the positive electrode tab and negative electrode tab protruding from the other surface of the bare cell;
   a metal case covering the outer surface of the bare cell; and
   a protection circuit board electrically connected to the metal case,
   wherein the protection circuit board includes at least one of:
   an antenna pad electrically connected to the metal case, and
   a ground electrically connected to the metal case, the ground being electrically connected to one of the positive electrode tab and the negative electrode tab of the bare cell and being grounded, and
   wherein the metal case is directly electrically connected to the protection circuit board.

2. The battery pack as claimed in claim 1, wherein:
   the protection circuit board is disposed on the other surface of the bare cell, from which other surface the positive electrode tab and the negative electrode tab of the bare cell protrude; wherein the protection circuit board includes a positive electrode pad and a negative electrode pad to which the positive electrode tab and the negative electrode tab of the bare cell are connected, and wherein the protection circuit board includes the antenna pad electrically connected to the metal case.

3. The battery pack as claimed in claim 2, wherein the metal case includes a connection terminal and the metal case is directly electrically connected to the antenna pad of the protection circuit board through the connection terminal.

4. The battery pack as claimed in claim 3, wherein the metal case includes a first metal case and a second metal case and the connection terminal is disposed on at least one of the first metal case and the second metal case.

5. The battery pack as claimed in claim 2, wherein the metal case includes a ground terminal electrically connected to one of the positive electrode tab and the negative electrode tab of the bare cell and which is grounded.

6. The battery pack as claimed in claim 5, wherein the metal case includes a first metal case and a second metal case and the ground terminal is disposed on at least one of the first metal case and the second metal case.

7. The battery pack as claimed in claim 5, wherein the ground terminal is electrically connected to the negative electrode tab.

8. The battery pack as claimed in claim 1, wherein:
   the bare cell includes first and second wide surfaces and right and left narrow surfaces, and
   the metal case includes a first metal case covering the first wide surface and the right and left narrow surfaces of the bare cell and a second metal case covering the second wide surface and the right and left narrow surfaces of the bare cell.

9. The battery pack as claimed in claim 8, wherein the first metal case and the second metal case each include opposite sides and the opposite sides of the first metal case and the second metal case are each bent to form extensions, and the first and second metal cases are coupled to each other by coupling the extensions.

10. The battery pack as claimed in claim 1, wherein the metal case includes at least one of steel and stainless steel.

11. The battery pack as claimed in claim 1, wherein the metal case includes stainless steel (SUS).

12. The battery pack as claimed in claim 1, wherein the bare cell has a periphery, side surfaces, a bottom surface and a frame disposed at the periphery of the bare cell and covering the side surfaces and bottom surface of the bare cell.

13. The battery pack as claimed in claim 12, wherein:
   the bare cell includes a top surface and an electrode tab protruding from the top surface, and
   the frame includes an upper frame disposed on the top surface of the bare cell and a lower frame covering the side surfaces and bottom surface of the bare cell.

14. The battery pack as claimed in claim 13, wherein the upper frame includes a through hole, the protection circuit board includes an external terminal and the external terminal protrudes through the through hole.

15. The battery pack as claimed in claim 1, wherein the bare cell is a pouch type secondary battery.

16. The battery pack as claimed in claim 1, wherein:
   the protection circuit board is disposed on the other surface of the bare cell, from which other surface the positive electrode tab and the negative electrode tab of the bare cell protrude; wherein the protection circuit board includes a positive electrode pad and a negative electrode pad to which the positive electrode tab and the negative electrode tab of the bare cell are connected.

17. The battery pack as claimed in claim 16, wherein:
   the metal case includes a ground terminal electrically connected to one of the positive electrode tab and the negative electrode tab of the bare cell and which is grounded, and
   the metal case is directly electrically connected to the protection circuit board through the ground terminal.

18. The battery pack as claimed in claim 17, wherein the metal case includes a first metal case and a second metal case and the ground terminal is disposed on at least one of the first metal case and the second metal case.

* * * * *